Aug. 18, 1964  C. MARCHIS  3,144,792
BORING HEAD
Filed May 14, 1962
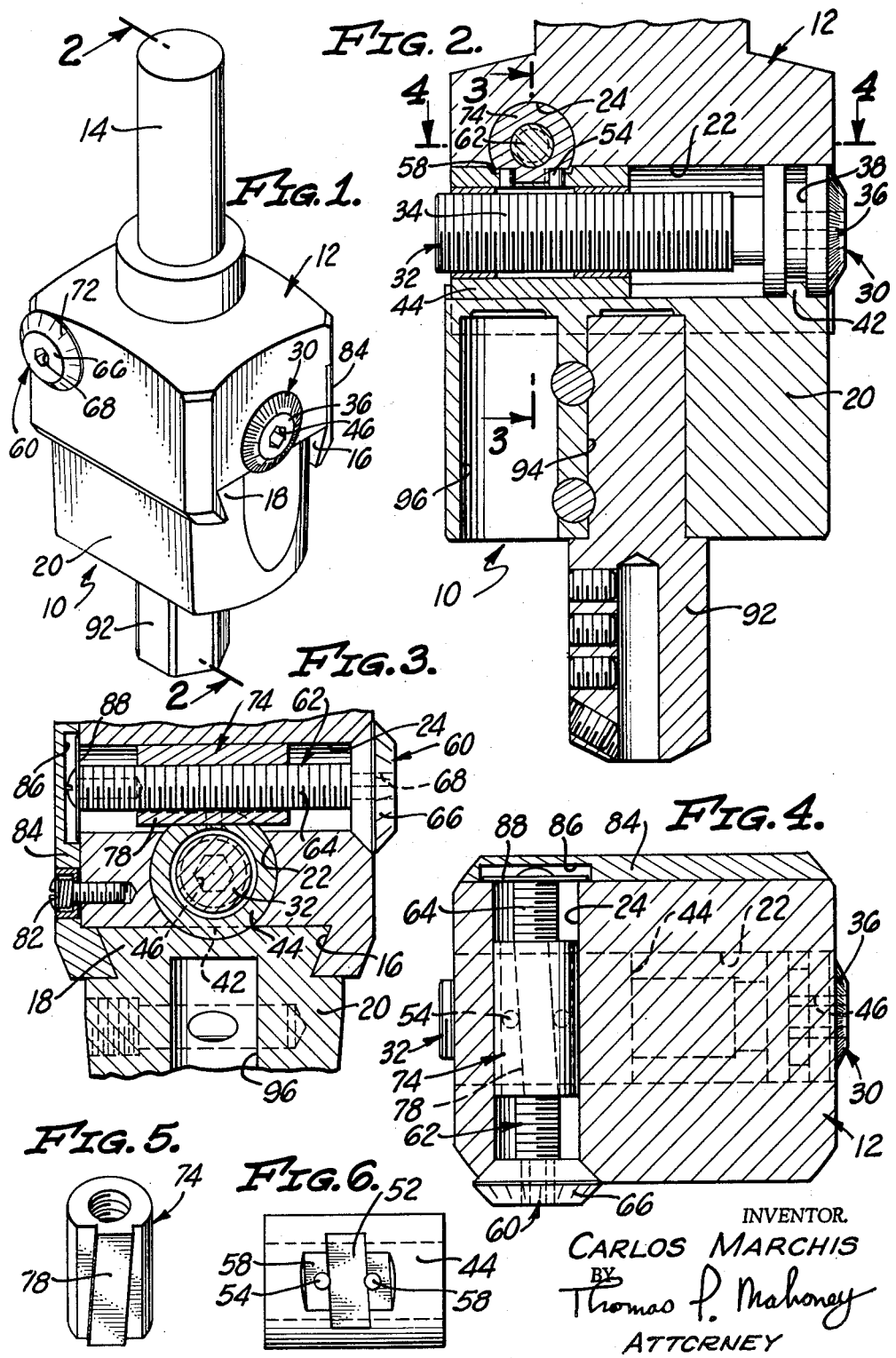
INVENTOR.
CARLOS MARCHIS
BY Thomas P. Mahoney
ATTORNEY United States Patent Office 3,144,792
Patented Aug. 18, 1964

3,144,792
BORING HEAD
Carlos Marchis, 918 S. Burlington, Los Angeles, Calif., assignor of fifteen percent to Thomas P. Mahoney, Pacific Palisades, Calif.
Filed May 14, 1962, Ser. No. 194,316
6 Claims. (Cl. 77—58)

This invention relates to a micrometric boring head and, more particularly, to a boring head characterized by its relative simplicity of construction and ease of operation.

Adjustable boring heads are provided, as is well known to those skilled in the art, in order that a cutting tool mounted in the tool holder of the boring head may be adjusted in relatively small increments with respect to a work piece in order that the depth of cut made by the tool supported in the tool holder may be accurately controlled. Of course, it is most desirable that the boring head be adjustable in the smallest possible increments.

It is, therefore, an object of my invention to provide a boring head which is characterized by the fact that it incorporates two adjustment means, one a coarse adjustment means, and the other a fine adjustment means whereby the tool holder of the boring head may be initially adjusted by the coarse adjustment means and the final adjustment of the tool may be determined by the fine adjustment means associated with said coarse adjustment means.

Another object of my invention is the provision of a boring head of the aforementioned character in which the coarse adjustment means is constituted by an elongated screw means and associated nut, and the fine adjustment is constituted by a key block engaging said nut of said coarse adjustment means by a keyway in said nut. Therefore, initial adjustment is accomplished by the screw and nut of the coarse adjustment means and the fine adjustment is accomplished by movement of the key block with respect to the keyway in the nut of the coarse adjustment means.

A further object of my invention is the provision, in a device of the aforementioned character, of a boring head housing incorporating a guideway for a tool holder or tool mount and a plurality of bores each of which has an adjustment means for said tool mount or tool holder incorporated therein. Therefore, the coarse adjustment means of the boring head may be adjusted separately from the fine adjustment means and there is no necessity for achieving the fine adjustment through the same means as the coarse adjustment, as is frequently the case in conventional boring heads.

An additional object of the invention is the provision of a boring head of the aforementioned character which is of extremely simple construction and includes a minimum number of component parts which may be readily assembled in operative relationship with each other, and which may be manufactured at a relatively low cost so that the total cost of the boring head of the invention is substantially less than conventional boring heads adapted to achieve the same results.

Other objects and advantages of the invention will be apparent from the following specification and the accompanying drawing, which is for the purpose of illustration only, and in which:

FIG. 1 is an isometric view of a boring head constructed in accordance with the teachings of the invention;

FIG. 2 is a vertical, sectional view taken on the broken line 2—2 of FIG. 1;

FIG. 3 is a vertical, sectional view taken on the broken line 3—3 of FIG. 2;

FIG. 4 is a transverse, sectional view taken on the broken line 4—4 of FIG. 2;

FIG. 5 is an isometric view illustrating a portion of the boring head; and

FIG. 6 is a top plan view of another element of the boring head.

Referring to the drawing, and particularly to FIGS. 1 through 4 thereof, I show a micrometric boring head 10 constructed in accordance with the teachings of the invention and including a housing 12 having a shank 14 upon the upper extremity thereof adapted to permit said boring head to be mounted in an associated machine. Incorporated in the underside of the housing 12 is an elongated guideway 16 of dovetail configuration in cross section adapted to receive the correspondingly formed upper extremity 18 of a tool holder 20.

Incorporated in the housing 12 is a first bore 22 which has its longitudinal axis located in parallel with the longitudinal axis of movement of the tool holder 20. A second bore 24 is formed in the housing 12 at right angles to the longitudinal axis of the first bore 22 and intersects said first bore intermediate its extremities, as best shown in FIG. 4 of the drawing.

Mounted in the first bore 22 is the first, coarse adjustment means 30 of the boring head, said coarse adjustment means including an elongated screw 32 which incorporates a 7 1/16–40 special thread 34 and which has a head 36 incorporating an annular slot 38. The annular slot 38 constitutes engagement means engageable with a corresponding projection 42 formed upon the upper surface of the tool holder 20. Engaged upon the other extremity of the screw 32 is a cylindrical nut 44 which is located in the extremity of the first bore 22 of the housing 12 adjacent the second bore 24 in said housing.

The head 36 of the screw 32 incorporates 50 equally spaced divisions which constitute indications of .001 of an inch. The head 36 also incorporates an Allen wrench socket 46 or the like adapted to permit the screw to be rotated in the first bore 22. Therefore, when the screw 32 is rotated by the insertion of a suitable tool in the opening 46, the screw 32 will be advanced in the nut 44 and will cause the tool holder 20 to be correspondingly advanced in the guideway 16 because of the mutual engagement of the engagement means constituted by the slot 38 in the head 36 and the corresponding projection 42 on the tool holder 20.

Formed in the upper perimeter of the nut 44 is a keyway 52 which is angularly oriented with respect to and intersects the longitudinal axis of the nut 44. The keyway 52 is oriented at an angle of 30 x 1,000″. The angular orientation of the keyway determines the relative extent of advance or retraction of the nut 44 in a manner to be described in greater detail below. Cylindrical pins 54 are inserted in lands 58 formed adjacent the keyway 52 and have their perimeters projecting into the keyway for a purpose which will be described in greater detail below.

Mounted in the second bore 24 in the housing 12 is second or fine adjustment means 60, said second or fine adjustment means including an elongated screw 62 incorporating a 1/4–40 special thread 64 and having a head 66. The head 66 includes an Allen wrench opening 68 and indicator lines 72 denoting .00005 of an inch of movement of the tool holder 20.

Mounted intermediate the extremities of the screw 62 and constituting part of the second or fine adjustment means 60 is a key block 74 incorporating an angularly oriented key 78 located in the keyway 52 of the nut 44. Therefore, when the elongated screw 62 of the fine adjustment means 60 is rotated, the key block 74 is advanced transversely of the longitudinal axis of movement of the screw 32 of the first adjustment means 30.

Advancement of the key block 74 in this manner causes the nut 44 to be correspondingly advanced. It will be noted that engagement of the key 78 with the side walls of the keyway 52 of the nut 44 does not occur since the sides of the key 78 are engaged upon the perimeters of the pins 54. Therefore, minimal frictional resistance to relative movement of the key 78 and nut 44 is encountered. Moreover, the pins 54 may be removed when worn and new pins installed in substitution therefor.

When the nut 44 is advanced in the above described manner, corresponding advancement of the screw 32 and the associated tool holder 20 occurs. Of course, during rotation of the screw 32 of the first adjustment means 30, the key 78 serves to retain the nut 44 against displacement in the first bore 22 of the housing 12.

Secured to the side of the housing 12 of the boring head 10 by means of screws 82, as best shown in FIG. 3 of the drawing, is a cover plate 84, said cover plate having a recess 86 in the underside thereof. Mounted in the recess 86 and in overlying relationship with the end of the second bore 24 is a retention washer 88 secured to an extremity of the screw 62 of the fine adjustment means 60. It is readily apparent that the various components of the boring head 10 may be manufactured at relatively low cost and that said components may be assembled in operative relationship with the housing 12 of the boring head 10 with a minimum expenditure of time and labor.

Secured to the tool holder 20 is a tool receiving shank 92 which is of conventional configuration and which is adapted to be received in either one of two bores 94 and 96 provided in the underside of said tool holder.

I thus provide by my invention a micrometric boring head which is characterized by its simplicity of construction and ease of operation. Despite its simplicity of construction it is capable of adjusting a tool mounted therein to .0001 of an inch. One of the significant aspects of the invention is the fact that the fine and coarse adjustments of the tool holder mounted in the micrometric boring head are accomplished by mutual cooperation of fine and coarse adjustment means so interrelated that, while they operate in combination and cooperation with each other, are capable of adjustment independently of each other.

While the invention has been described by means of specific examples and specific embodiments, the invention is not limited thereto since obvious modifications and variations will occur to those skilled in the art without departing from the spirit and scope of the invention as defined by the appended claims.

I claim:

1. In a boring head, the combination of: a housing having mounting means thereupon adapted to facilitate the mounting of the housing on an associated machine tool; a tool holder mounted for movement in said housing; coarse adjustment means operatively connected to said tool holder for causing movement of said tool holder in relatively large increments, said coarse adjustment means being constituted by a nut slidably mounted in said housing for longitudinal movement and a screw engageable with said nut and longitudinally movable by rotation relative to said nut, said screw being connected to said tool holder to cause longitudinal movement thereof; and fine adjustment means connected to said tool holder through said coarse adjustment means and adapted to cause relatively fine increments of movement of said coarse adjustment means and said tool holder, said fine adjustment means being engageable with said nut to cause longitudinally sliding movement of the same and to longitudinally move said nut and said screw simultaneously.

2. In a boring head, the combination of: a housing having mounting means thereupon adapted to facilitate the mounting of the housing on an associated machine tool; a tool holder mounted for movement in said housing; coarse adjustment means operatively connected to said tool holder for causing movement of said tool holder in relatively large increments, said coarse adjustment means being constituted by an elongated screw having its axis of rotation parallel with the path of movement of said tool holder and a nut slidably mounted in said housing for longitudinal movement engaged by said screw, said screw being longitudinally movable in said housing by rotation relative to said nut, said screw being connected to said tool holder to cause longitudinal movement thereof; and fine adjustment means connected to said tool holder through said coarse adjustment means and adapted to cause relatively fine increments of movement of said coarse adjustment means and said tool holder, said fine adjustment means being disposed in said housing normally to the axis of rotation of said screw of said coarse adjustment means and being engageable with said nut to cause longitudinal sliding movement of the same and to longitudinally move said nut and said screw simultaneously.

3. In a boring head, the combination of: a housing having mounting means thereupon adapted to facilitate the mounting of the housing on an associated machine tool; a tool holder mounted for movement in said housing; coarse adjustment means operatively connected to said tool holder for causing movement of said tool holder in relatively large increments, said coarse adjustment means being constituted by an elongated screw having its axis parallel with the path of movement of said tool holder and a nut slidably mounted in said housing for longitudinal movement engaged by said screw, said nut having a keyway therein, said screw being longitudinally movable in said housing by rotation relative to said nut, said screw being connected to said tool holder to cause longitudinal movement thereof; and fine adjustment means connected to said tool holder through said coarse adjustment means and adapted to cause relatively fine increments of movement of said coarse adjustment and said tool holder, said fine adjustment means being disposed in said housing normally to the axis of rotation of said screw of said coarse adjustment means and being engageable with said coarse adjustment means to cause bodily movement of the same, said fine adjustment means including a screw having its axis of rotation disposed normally to the axis of rotation of said screw of said coarse adjustment means and a key block engageable with said keyway in said nut to cause longitudinal sliding movement of said nut, said key block normally holding said nut against said longitudinal sliding movement.

4. In a micrometric boring head for mounting a tool, the combination of: a housing having an elongated guideway therein and intersecting bores located in proximity to said guideway; a tool holder mounted for sliding movement in said guideway; coarse adjustment means mounted in one of said bores for causing movement of said tool holder in said guideway, said coarse adjustment means including a first screw longitudinally and rotatably movable in said housing, and a nut engaged by said screw for longitudinal movement with said screw or movement of said screw relative thereto, said nut having a keyway therein; and fine adjustment means mounted in the other of said bores and including a second, elongated screw disposed with its axis of rotation normally to the axis of rotation of said first screw, said second screw having a key block engageable therewith whose key is located in the keyway of said nut to cause said longitudinal movement of the same when said key is moved in said keyway.

5. In a boring head, the combination of: a housing having a guideway therein and intersecting first and second bores; a tool holder mounted for movement in said guideway; first adjustment means mounted in said first bore including a first screw disposed with its axis of rotation in parallelism with the axis of said bore and a nut engaged by said screw, said screw and said nut being movable relative to each other or being axially shiftable simultaneously with each other in said housing and said nut having a keyway; and second adjustment means disposed in said second bore including a second screw having a key block thereupon engageable with said keyway in said nut to cause said simultaneous axial shifting of said screw and said nut when said key block is moved by said second screw.

6. In a boring head, the combination of: a housing having a guideway therein and first and second bores disposed normally to each other; a tool holder mounted for sliding movement in said guideway, said tool holder having engagement means thereupon; first adjustment means for said tool holder mounted in said first bore, said first adjustment means including a first elongated screw disposed with its axis of rotation in parallelism to the axis of said bore, said first screw being engaged in a corresponding nut and having a head thereupon incorporating engagement means engageable with the engagement means of said holder, said screw and said nut being movable relative to each other or being axially shiftable simultaneously with each other in said housing and said nut having a keyway; and second adjustment means including a second, elongated screw in said second bore and a key block engageable with said keyway in said nut to cause simultaneous axial shifting of said screw and said nut when said key block is moved by said second screw.

References Cited in the file of this patent

UNITED STATES PATENTS

| | | |
|---|---|---|
| 2,135,339 | Ihm et al. | Nov. 1, 1938 |
| 2,874,597 | Bach | Feb. 24, 1959 |

FOREIGN PATENTS

| | | |
|---|---|---|
| 599,503 | Great Britain | Mar. 15, 1948 |
| 912,886 | Germany | June 3, 1954 |